(12) United States Patent
Im et al.

(10) Patent No.: US 12,117,861 B2
(45) Date of Patent: Oct. 15, 2024

(54) MAGNETORHEOLOGICAL FLUID-BASED HAPTIC KNOB APPARATUS

(71) Applicants: Hyundai Motor Company, Seoul (KR); Kia Corporation, Seoul (KR); Korea University Of Technology And Education Industry-University Cooperation Foundation, Cheonan-si (KR)

(72) Inventors: Yoon Im, Suwon-si (KR); Yong Won Choi, Seoul (KR); Myung Hoe Kim, Seoul (KR); Joo Hwa Kim, Hwaseong-si (KR); In Ho Yun, Cheonan-si (KR); Hyun U Ko, Cheonan-si (KR); Sang Youn Kim, Seoul (KR)

(73) Assignees: Hyundai Motor Company, Seoul (KR); Kia Corporation, Seoul (KR); Korea University Of Technology And Education Industry-University Cooperation Foundation, Cheonan-si (KR)

( * ) Notice: Subject to any disclaimer, the term of this patent is extended or adjusted under 35 U.S.C. 154(b) by 0 days.

(21) Appl. No.: 18/054,141

(22) Filed: Nov. 9, 2022

(65) Prior Publication Data
US 2023/0259153 A1    Aug. 17, 2023

(51) Int. Cl.
*G05G 5/03*     (2008.04)
*G05G 1/08*     (2006.01)

(52) U.S. Cl.
CPC ............... *G05G 5/03* (2013.01); *G05G 1/08* (2013.01); *G05G 2505/00* (2013.01)

(58) Field of Classification Search
None
See application file for complete search history.

(56) References Cited

U.S. PATENT DOCUMENTS

| 9,245,454 | B2 | 1/2016 | Kim et al. |
| 10,318,002 | B2 | 6/2019 | Battlogg |
| 10,942,538 | B2 | 3/2021 | Battlogg |
| 2020/0215908 | A1 | 7/2020 | Petrzik et al. |

FOREIGN PATENT DOCUMENTS

| DE | 10029191 A1 | * | 12/2001 | ............ B60K 37/06 |
| EP | 3382495 B1 | | 6/2020 | |
| KR | 100981277 B1 | | 9/2010 | |
| KR | 101341089 B1 | | 12/2013 | |
| KR | 20210080120 A | | 6/2021 | |
| KR | 102353686 B1 | | 1/2022 | |
| WO | WO-2008125306 A1 | * | 10/2008 | ........... E05C 17/305 |
| WO | WO-2018116569 A1 | * | 6/2018 | ............ B60T 8/4081 |

* cited by examiner

*Primary Examiner* — Vicky A Johnson
(74) *Attorney, Agent, or Firm* — Slater Matsil, LLP

(57) ABSTRACT

In an embodiment a magnetorheological fluid-based haptic knob apparatus includes a housing, a solenoid coil mounted inside the housing, the solenoid coil configured to generate a magnetic field thereby providing magnetic flux, a shaft connected to the housing and including a rotational rod, wherein the shaft is configured to generate a plurality of modes and a magnetorheological fluid accommodated inside the housing, the magnetorheological fluid configured to form a magnetic chain in response of the magnetic flux.

20 Claims, 5 Drawing Sheets

MAGNETORHEOLOGICAL FLUID-BASED HAPTIC KNOB APPARATUS

CROSS-REFERENCE TO RELATED APPLICATIONS

The present application claims priority to Korean Patent Application No. 10-2022-0019864, filed Feb. 16, 2022, the entire contents of which are incorporated herein for all purposes by this reference.

TECHNICAL FIELD

The present disclosure relates to a magnetorheological fluid-based haptic knob apparatus and, more particularly, to a magnetorheological fluid-based haptic knob apparatus being capable for providing various feelings of operation with one knob, using a magnetorheological fluid (MRF) that varies in viscosity according to the intensity of a magnetic field. The magnetorheological fluid-based haptic knob apparatus provides the convenience of enabling a user to recognize knob operation steps according to the strength of a haptic impression (a feeling of knob resistance).

BACKGROUND

Usually, various applications having interfaces with electronic/communication devices have been widely used. Accordingly, there is a growing concern over natural easy-to-use interfaces capable of providing information.

Human vision is most important in recognizing an object. However, in recent years, tactile-feeling acquisition of information, such as vibration, surface roughness, and temperature change, has gained popularity as a next-generation technique of information transfer.

As such, addition of haptic information to visual information may further increase the human ability to recognize an object. The term haptic relates to the sense of touch of a human fingertip (or a stylus pen) on an object and therefore should be construed to provide tactile feedback that occurs when an object is brought into contact with the human skin and a kinesthetic force feedback that occurs when the human joints and muscles are pressed against an object brought into contact with the human skin.

Usually, it is most ideal that haptic apparatuses can reproduce the dynamic property (vibration, sense of touch, and sound that are transferred when a button is pressed with the human finger) that a user can feel the same responsiveness when he/she touches on a virtual object (for example, a button for displaying a window screen) as when he/she touches on an actual object (for example, an actual button). These haptic apparatuses, such as mechatronics apparatus, have adopted a motor and a link mechanism in order to improve the performance thereof.

However, the mechanical haptic apparatus weighs a lot and has a complex link system. Furthermore, the mechanical haptic apparatus is difficult to minimize, and an inertia-caused quick responsiveness speed thereof is difficult to realize.

To solve this problem, in recent years, research has been conducted on smart materials, such as a rheological fluid.

That is, the smart material, such as the rheological fluid, is a fluid material that itself reacts with electric energy (for example, an electric field) magnetic field) applied from the outside or with magnetic energy (for example, a magnetic field) and thus varies in viscosity. The rheological materials are broadly categorized into electrorheological fluids that react with the electric field and magnetorheological fluids that react with the magnetic field.

A trend in recent years has been for the rheological fluid to be used in mobile terminals (for example, mobile phones, PDAs, laptop computers, notebook computers, PMPs, MP3 players, electronic dictionaries, and the like) to provide a haptic effect, actuators for a robot, sense-of-touch transfer apparatuses, and dampers. There are ever-expanding applications of the rheological fluid.

However, an area where the rheological fluid reacts with the electric field and the magnetic field thereby increasing the viscosity thereof is small. There is also a restriction on application of the rheological fluid in that a strong electric field or magnetic field are necessary to entirely change the viscosity of a large amount of the rheological fluid, thereby increasing power consumption.

Particularly, the use of the rheological fluid in a haptic device in the mobile terminal increases power consumption. Moreover, a storage area is necessary to accommodate the incompressible rheological fluid when pressed from one side. Thus, there is a technical restriction in that the design of the storage area makes it difficult to minimize a product that uses the rheological fluid.

The foregoing is intended merely to aid in the understanding of the background of the present disclosure, and is not intended to mean that the present disclosure falls within the purview of the related art that is already known to those skilled in the art.

SUMMARY

Embodiments provide a magnetorheological fluid-based haptic knob apparatus in which a magnetorheological fluid that varies in viscosity according to the intensity of a magnetic field flows for transitioning to a plurality of operation modes, for example, a shear mode and a flow mode and in which a plurality of resistances are thus generated in a combined manner. When rotating a shaft, different torques are generated. Thus, when the knob is in contact for operation, various haptic impressions can be provided to the user.

Embodiments provided a magnetorheological fluid-based haptic knob apparatus including: a solenoid coil mounted inside a housing and, when provided with electric current, generating a magnetic field, thereby forming a magnetic flux; a shaft combined with the housing, including a rotational rod, and generating a plurality of resistances in a combined manner; and a magnetorheological fluid accommodated inside the housing and forming a magnetic chain as a result of the magnetic flux being formed by the magnetic field occurring in the solenoid coil.

The magnetorheological fluid-based haptic knob apparatus may further include a housing cover covering the open top of the housing formed in the shape of a cylinder open at the top, the rotational rod being formed in the center of the housing cover in a manner that passes therethrough.

In the magnetorheological fluid-based haptic knob apparatus, the shaft may include: a main body combined with the housing in a manner that is rotatable there inside; and a bump guiding flow of the magnetorheological fluid when the main body is rotated and thus generating a resistance by the magnetorheological fluid.

In the magnetorheological fluid-based haptic knob apparatus, the bump may be obliquely mounted in a plurality of mounting areas defined on the main body in such a manner as to form a gap through which the magnetorheological fluid flows after flowing through the mounting areas.

In the magnetorheological fluid-based haptic knob apparatus, the shaft may generate a shear resistance and a flow resistance in a combined manner by rotation of the main body and by the bump, respectively.

The magnetorheological fluid-based haptic knob apparatus may further include a control knob combined with the rotational rod and protruding out of the housing in a manner that is exposed to the outside, the control knob rotating the shaft to transfer the resistance generated by interrupting the magnetic chain formed in the magnetorheological fluid.

In the magnetorheological fluid-based haptic knob apparatus, the control knob may be provided in such a manner as to transfer the resistances to the user with different magnitudes by varying viscosity of the magnetorheological fluid according to an amount of electric current applied to the solenoid coil.

In the magnetorheological fluid-based haptic knob apparatus, when the plurality of resistances are produced in a combined manner by setting electric current signals to be applied to the solenoid coil to have different waveforms, it is possible that resistance sensitivity is set.

According to embodiments, in order to provide the user with the haptic impression when the knob is in contact for operation, the magnetorheological fluid that varies in viscosity according to the intensity of the magnetic field flows for transitioning to the plurality of operation modes, for example, the shear mode and the flow mode, thereby generating the plurality of resistances in a consecutive manner. Accordingly, when rotating the shaft, different torques are generated. The advantageous effect of providing various haptic impressions with one knob can be achieved.

Accordingly, according to embodiments, the user can recognize steps of operating the control knob, by feeling a strength of the haptic impression. Thus, the advantageous effect of improving the convenience in use can be achieved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF ILLUSTRATIVE EMBODIMENTS

A desired embodiment of the present disclosure will be described in detail below with reference to the accompanying drawings.

An advantage and a feature of the present disclosure and a method of achieving the advantage and the feature will be apparent from the embodiment that will be described below in detail with reference to the accompanying drawings.

However, the present disclosure is not limited to the embodiment that will be disclosed below and will be practiced in various different forms. The embodiment is only provided to make a complete disclosure of the present disclosure and to provide a person of ordinary skill in the art to which the present disclosure pertains with definite notice as to the scope of the present disclosure. The scope of the present disclosure should be only defined as in claims.

In addition, a detailed description of a well-known technology or the like related to the present disclosure, when determined as making the gist and nature of the present disclosure obfuscated, will be omitted.

Figure 1:
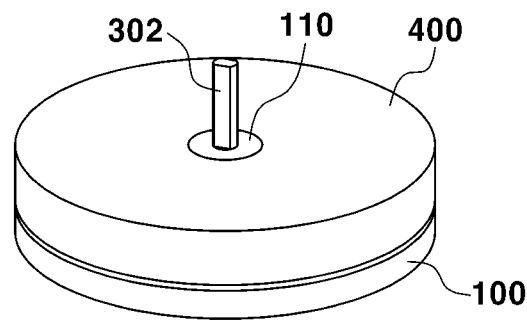
FIG. 1 is a view illustrating an assembled state of a magnetorheological fluid-based haptic knob apparatus according to an embodiment of the present disclosure.
Figure 2:
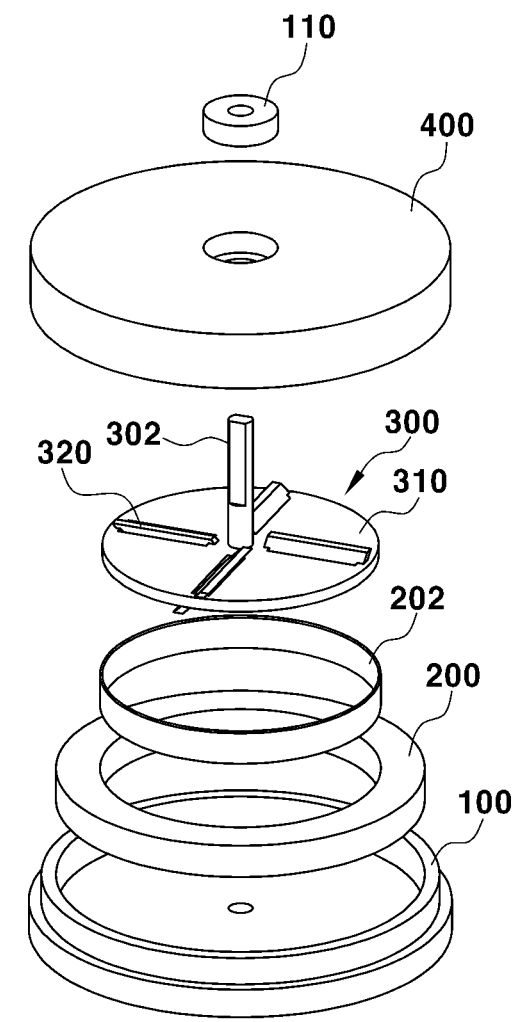
FIG. 2 is a view illustrating a disassembled state of the magnetorheological fluid-based haptic knob apparatus according to the embodiment of the present disclosure.

FIG. 1 is a view illustrating an assembled state of a magnetorheological fluid-based haptic knob apparatus according to an embodiment of the present disclosure. FIG. 2 is a view illustrating a disassembled state of the magnetorheological fluid-based haptic knob apparatus according to the embodiment of the present disclosure.

Figure 3:
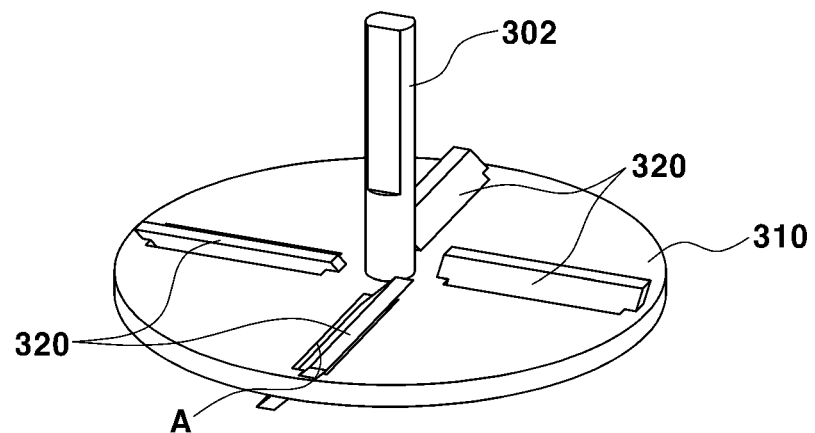
FIG. 3 is a view illustrating a shaft of the magnetorheological fluid-based haptic knob apparatus according to the embodiment of the present disclosure.
Figure 4:
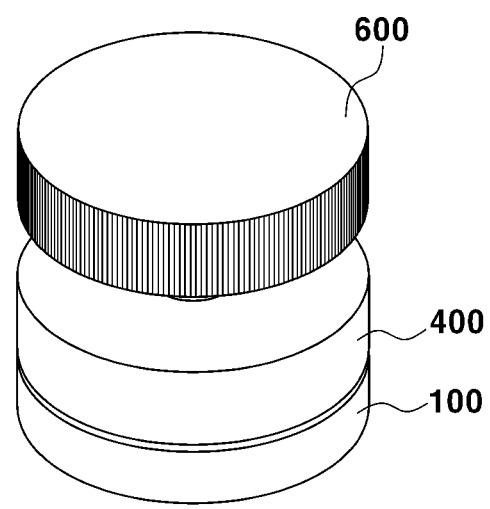
FIG. 4 is a view illustrating assembling of a knob of the magnetorheological fluid-based haptic knob apparatus according to the embodiment of the present disclosure.

FIG. 3 is a view illustrating a shaft of the magnetorheological fluid-based haptic knob apparatus according to the embodiment of the present disclosure. FIG. 4 is a view illustrating assembling of a knob of the magnetorheological fluid-based haptic knob apparatus according to the embodiment of the present disclosure.

Figure 5A:
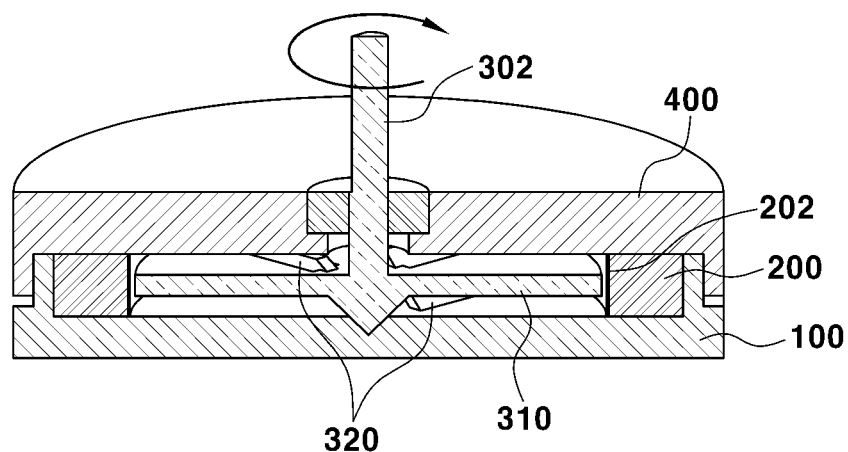
FIGS. 5A and 5B are views each illustrating a shear mode of the magnetorheological fluid-based haptic knob apparatus according to the embodiment of the present disclosure.
Figure 5B:
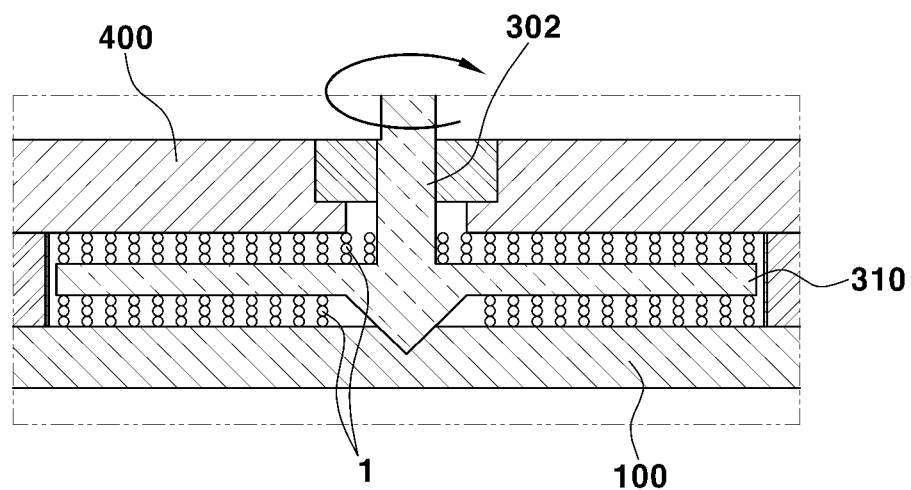
Figure 6A:
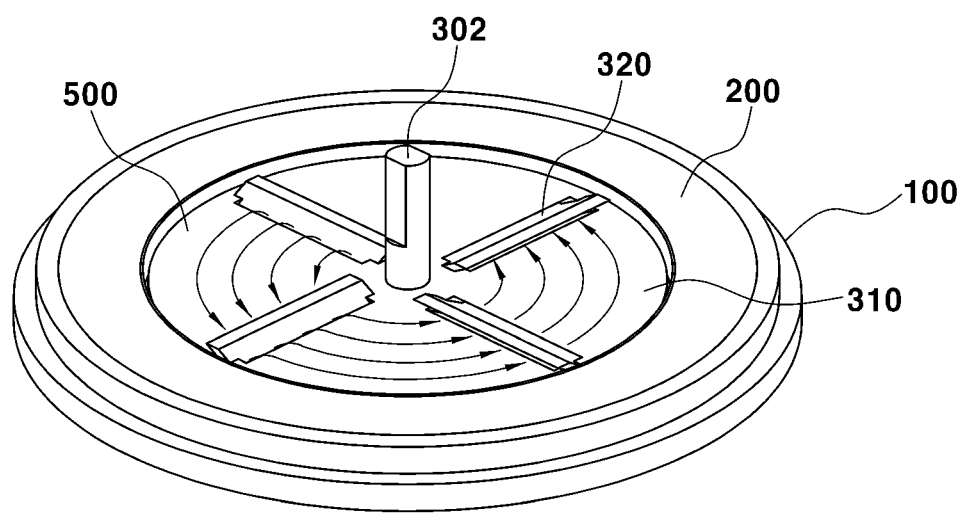
FIGS. 6A and 6B are views each illustrating a flow mode of the magnetorheological fluid-based haptic knob apparatus according to the embodiment of the present disclosure.
Figure 6B:
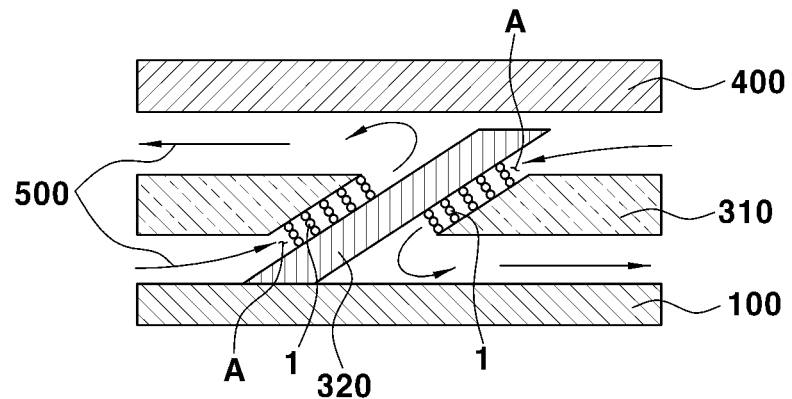
Figure 7:
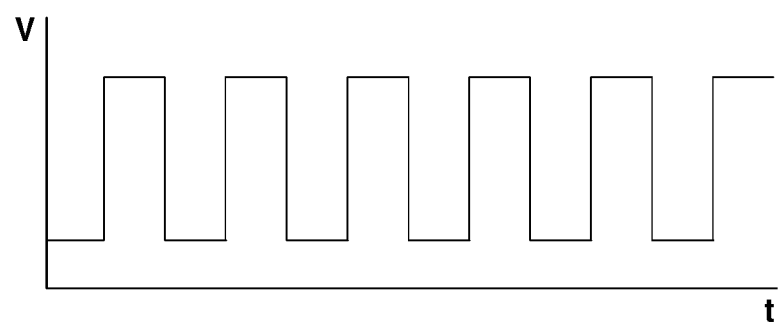
FIG. 7 is a view illustrating a practical example of a signal waveform applied to the magnetorheological fluid-based haptic knob apparatus according to the embodiment of the present disclosure.

FIGS. 5A and 5B are views each illustrating a shear mode of the magnetorheological fluid-based haptic knob apparatus according to the embodiment of the present disclosure. FIGS. 6A and 6B are views each illustrating a flow mode of the magnetorheological fluid-based haptic knob apparatus according to the embodiment of the present disclosure. FIG. 7 is a view illustrating a practical example of a signal waveform applied to the magnetorheological fluid-based haptic knob apparatus according to the embodiment of the present disclosure.

As illustrated in FIGS. 1 and 2, the magnetorheological fluid-based haptic knob apparatus according to the present embodiment includes a housing 100, a solenoid coil 200, a shaft 300, a housing cover 400, and a magnetorheological fluid (MRP) 500.

The housing 100 is formed in the shape of a cylinder that is open at the top.

The housing 100 may be designed in such a manner as to have a structure in which magnetic shielding is possible in order to prevent loss of a magnetic field occurring in the solenoid coil 200 described below.

To this end, the housing 100 may be combined with the housing cover 400. The housing cover 400 is formed in such a manner as to cover the open top of the housing 100. Thus, the above-mentioned magnetic shielding is possible inside the housing 100.

Furthermore, the housing 100 may include a sealing bearing 110. The sealing bearing 110 may not only prevent leakage of the magnetorheological fluid 500 accommodated inside the housing 100, but may also securely hold a position of a rotational rod 302 of the shaft 300 described below.

The solenoid coil 200 is arranged into a solenoid coil mounting area defined on the housing 100. The solenoid coil 200 is formed in the shape of an annular ring in such a manner that, when electric current is applied thereto, a magnetic field is generated, thereby forming a magnetic flux.

With this simple structure, it is possible that the solenoid coil 200 is arranged into the solenoid coil mounting area. Thus, the mounting of the solenoid coil 200 into the solenoid coil mounting area defined on the housing 100 may facilitate assembling, disassembling, and processing.

The solenoid coil 200 includes an annular solenoid coil housing 202 for protecting the solenoid coil 200 from the shaft 300 described below. The solenoid coil 200 equipped with the annular solenoid coil housing 202 may be arranged in the solenoid coil mounting area in an inserted manner.

The shaft 300 whose lower portion is wedge-shaped lower portion is arranged into the housing 100. Thus, the shaft 300 can be positioned in such a manner as to be rotatable inside the housing 100 (refer to FIG. 5A). Desirably, the shaft 300 can be positioned in such a manner as to be rotatable about the rotational rod 302, that is an upper portion of the shaft 300, in the leftward and rightward direction inside the housing 100.

The magnetorheological fluid 500 is accommodated inside the housing 100, more specifically, accommodated in both upper and lower portions of a main body 310 that constitutes the shaft 300. Thus, formation of the magnetic flux by the magnetic field occurring in the solenoid coil 200 forms a magnetic chain 1 (refer to FIG. 5B).

When rotated by operation, the shaft 300 may generate a plurality of resistances, that is, a shear resistance and a flow resistance, in a combined manner.

To this end, the shaft 300, as illustrated in FIG. 3, includes the main body 310 and a plurality of bumps 320.

The main body 310 is combined with the housing 100 in a manner that is rotatable inside the housing 100. The rotational rod 302 is provided in the center of the housing 100.

When the main body 310 is rotated about the rotational rod 302, the magnetorheological fluid 500 flows, by the magnetic field, in a direction in parallel to the direction of the rotation of the main body 310 thereby providing or transitioning to the shear mode. The resulting resistance is consistent with the shear mode.

When the main body 310 is further rotated about the rotational rod 302, the bumps 320 cause the magnetorheological fluid 500 to flow through the gaps A thereby providing or transitioning to the flow mode (refer to FIG. 6B). The resulting resistance us consistent with the flow mode. The flow mode is different from the shear mode.

The bump 320 is mounted in a plurality of mounting areas, respectively, that are defined on the main body 310. More particularly, the bump 320 is obliquely mounted in such a manner as to form a predetermined gap A through which the magnetorheological fluid 500 flows after flowing through the mounting area. When the magnetorheological fluid 500 flows, by the magnetic field, for transitioning to the flow mode, the plurality of bumps 200 guide the magnetorheological fluid 500 through a flow path for transitioning to the flow mode. At the same time, the bump 200 causes the flow resistance to be generated with the shear resistance in a combined manner.

FIGS. 5A and 5B illustrate that the shear mode is in use. In the shear mode, when the main body 310 rotates, the magnetorheological fluid 500 flows in a direction in parallel to a direction of the applied magnetic field, and thus the magnetic chain 1 connecting the main body 310 and each of the housing 100 and the housing cover 400 is selectively severed or interrupted, thereby generating the shear resistance.

In contrast, FIGS. 6A and 6B illustrate that the flow mode is in use. In the flow mode, when the main body 310 further rotates in the shear mode, the magnetorheological fluid 500 flows in a direction that is not in parallel to the direction of the magnetic field, that is, flows through the gap A along an inclined surface of the bump 320 in the direction of the applied magnetic field. Thus, the magnetic chain 1 formed in the gap A is selectively severed or interrupted, thereby generating the flow resistance.

The magnetorheological fluid (MRP) 500 here is one of intelligent materials that reversibly vary in fluidal viscosity property according to the intensity of the magnetic field. Usually, the magnetorheological fluid 500 refers to a non-colloidal suspension that results from dispersing iron, nickel, or cobalt that has fine particles, each with a diameter of several microns to several tens of microns, or a magnetic alloy thereof into a dispersive material, such as mineral oil, synthetic hydrocarbon, water, silicone oil, or esterified fatty acid.

The magnetorheological fluid (MRP) 500 widely varies in fluidal property, such as fluidal viscosity property, according to application of the magnetic field through the solenoid coil 200. Moreover, the magnetorheological fluid 500 has excellent durability, relatively low sensitivity to contaminants, greater responsiveness to a magnetic field, and reversibility.

Normally, the magnetic chain 1 is formed as a result of the magnetic flux being formed by the magnetic field occurring in the solenoid coil 200. Thus, when the magnetic field is not applied, the property of a Newtonian fluid appears. Conversely, when the magnetic field is applied, dispersed particles form a dipole, and thus the magnetic chain 1 having a fiber structure is formed in the direction parallel to the applied magnetic field. This fiber structure of the magnetic chain 1 increases the viscosity and thus causes a shear force preventing the flow of the magnetorheological fluid 500 or a resistive force against the flow thereof, thereby increasing dynamic yield stress.

As illustrated in FIG. 5B, using this property, when the shaft 300 is rotated with respect to the housing 100, the magnetic chain 1 is severed or interrupted in the described-above shear mode inside the housing 100, thereby generating torque. Thus, the shear resistance is generated.

As illustrated in FIGS. 6A and 6B, when the shaft 300 is further rotated continuously in the shear mode, the magnetorheological fluid 500 flows through the gap A along the inclined surface of the bump 320 (refer to the direction of the arrow in FIG. 6B). Accordingly, when the magnetic chain 1 formed in the gap A is interrupted, a relatively larger torque is generated than in the shear mode. Thus, a different resistance consistent with the flow mode is generated than in the shear mode.

Therefore, according to embodiments of the present embodiment, contact with a control knob 600 for operation provides a haptic impression. As described above, using the property of the normal magnetorheological fluid 500, when the shaft 300 is rotated, the plurality of resistances are continuously generated which are typically a combination of the shear mode and the flow mode, due to the structures of the man body 310 and the bump 320. Accordingly, in a case where the control knob 600 is rotated for operation, different torques are generated. Thus, one control knob 600 can provide various haptic impressions.

Therefore, according to the present embodiment, by feeling the strength of the haptic impression, a user can recognize steps of operating the control knob 600. Thus, the recognition of the steps for operating the control knob 600 can improve the convenience in use.

The control knob 600, as illustrated in FIG. 4, is formed in the same shape of a cylinder as the housing 100, and is combined with the rotational rod 302 so that control knob 600 protrudes out of the housing 100 in a manner that is exposed to the outside.

The user grips the control knob 600 with his/her hand. When the user rotates the shaft 300 with a hand grip on the control knob 600, the magnetic chain 1 formed in the gain A is interrupted, and thus the generated resistance is transferred.

The control knob 600 is controlled in such a manner as to have different resistance types and patterns by varying the viscosity of the magnetorheological fluid 500 according to an amount of electric current applied to the solenoid coil 200. For example, in gear shifting, a step R has a different frequency than a step P, and a step D has a different frequency than the step R. Thus, when the gear shifting is performed, a haptic pattern is set to widely vary according to a frequency and then to be transferred to the control knob 600. Accordingly, the user can recognize the steps of operating the control knob 600 in a more effective manner. Thus, the convenience in use can be improved.

In addition, electric current signals to be applied to the solenoid coil 200 are set to have different waveforms. Thus, through the shaft 300, the shear resistance and the flow resistance are generated in a combined manner. It is possible that resistance sensitivity is set.

More specifically, as illustrated in FIG. 7, if a voltage to be applied to the solenoid coil 200 has a signal waveform that repeatedly increases or decreases in magnitude, that is, a signal square waveform, texture information of a relatively coarse resistance can be provided to the control knob 600.

Furthermore, although not illustrated, if a voltage to be applied on a per-hour basis has a signal waveform that constantly increases or decreases in magnitude, that is, a signal direct-current waveform with a predetermined magnitude, when rotating the shaft 300, texture information of a soft or stiff resistance can be provided to the control knob 600.

According to the present disclosure, in order to provide the user with the haptic impression when the knob is in contact for operation, the magnetorheological fluid that varies in viscosity according to the intensity of the magnetic field flows for transitioning to the plurality of operation modes, for example, the shear mode and the flow mode, thereby generating the plurality of resistances in a consecutive manner. Accordingly, when rotating the shaft, different torques are generated. Thus, the advantageous effect of providing various haptic impressions with one knob can be achieved.

Accordingly, according to the present disclosure, by feeling the strength of the haptic impression, the user can recognize the steps of operating the control knob 600. Thus, the advantageous effect of improving the convenience in use can be achieved.

The embodiment of the present disclosure is described above only in an exemplary manner with reference to the drawings. It would be understandable to a person of ordinary skill in the art to which the present disclosure pertains that various modifications can be made to the embodiment and that embodiments resulting from the modifications can be configured to be selectively combined. Therefore, the legitimate scope of the present disclosure should be determined by the technical idea that is defined in the following claims.

What is claimed is:

1. A magnetorheological fluid-based haptic knob apparatus comprising:
   a housing;
   a solenoid coil mounted inside the housing, the solenoid coil configured to generate a magnetic field thereby providing magnetic flux;
   a shaft connected to the housing and configured to generate a plurality of modes;
   a magnetorheological fluid accommodated inside the housing, the magnetorheological fluid configured to form a magnetic chain in response of the magnetic flux; and
   a housing cover covering an open top of the housing,
   wherein the shaft comprises:
      a rotational rod,
      a main body rotatably arranged in the housing, and
      bumps configured to guide a flow of the magnetorheological fluid when the main body rotates.

2. The apparatus of claim 1, wherein the housing cover is shaped as a cylinder and has an opening at a top.

3. The apparatus of claim 2, wherein the rotational rod passes through a center of the housing cover.

4. The apparatus of claim 3, further comprising a sealing bearing holding the rotational rod in the center of the housing cover.

5. The apparatus of claim 1, wherein the bumps are obliquely mounted in a plurality of mounting areas located on the main body such that they form a gap through which the magnetorheological fluid is able to flow.

6. The apparatus of claim 1, wherein the shaft is configured to generate a shear mode and a flow mode by rotating the main body with the bumps.

7. The apparatus of claim 1, further comprising a control knob connected to the rotational rod and arranged on the housing so that the control knob is exposed to an outside, wherein the control knob configured to rotate the shaft.

8. The apparatus of claim 7, wherein the control knob is configured to transfer a resistance to a user with different magnitudes by varying a viscosity of the magnetorheological fluid according to an amount of electric current applied to the solenoid coil.

9. The apparatus of claim 1, wherein a resistance sensitivity is set when a plurality of resistances are produced in a combined manner by setting electric current signals to be applied to the solenoid coil to have different waveforms.

10. The apparatus of claim 7, wherein the control knob is configured to apply an electrical signal to the solenoid coil so that a viscosity of the magnetorheological fluid is varied and so that different resistances are provided.

11. The apparatus of claim 10, wherein the electrical signal is an electrical current having different waveforms.

12. A magnetorheological fluid-based haptic knob apparatus comprising:
    a housing;
    a solenoid coil mounted inside the housing, the solenoid coil configured to generate a magnetic field thereby providing magnetic flux;
    a shaft connected to the housing and including a rotational rod, wherein the shaft is configured to generate a plurality of modes; and
    a magnetorheological fluid accommodated inside the housing, the magnetorheological fluid configured to form a magnetic chain in response of the magnetic flux, wherein the shaft comprises a main body rotatably arranged in the housing and bumps configured to guide a flow of the magnetorheological fluid when the main body rotates.

13. The apparatus of claim 12, wherein the bumps are obliquely mounted in a plurality of mounting areas located on the main body such that they form a gap through which the magnetorheological fluid is able to flow.

14. The apparatus of claim 12, wherein the shaft is configured to generate a shear mode and a flow mode by rotating the main body with the bumps.

15. A magnetorheological fluid-based haptic knob apparatus comprising:
   a housing;
   a solenoid coil mounted inside the housing, wherein the solenoid coil is configured to generate a magnetic field thereby providing magnetic flux;
   a shaft connected to the housing and configured to generate a plurality of modes;
   a magnetorheological fluid accommodated inside the housing, wherein the magnetorheological fluid is configured to form a magnetic chain in response of the magnetic flux; and
   a control knob connected to a rotational rod and arranged on the housing so that the control knob is exposed to an outside, wherein the control knob is configured to rotate the shaft, and
   wherein the shaft comprises:
      the rotational rod,
      a main body rotatably arranged in the housing, and
      bumps configured to guide a flow of the magnetorheological fluid when the main body rotates.

16. The apparatus of claim 15, wherein the control knob is configured to transfer a resistance to a user with different magnitudes by varying a viscosity of the magnetorheological fluid according to an amount of electric current applied to the solenoid coil.

17. The apparatus of claim 15, wherein a resistance sensitivity is set when a plurality of resistances are produced in a combined manner by setting electric current signals to be applied to the solenoid coil to have different waveforms.

18. The apparatus of claim 15, wherein the control knob is configured to apply an electrical signal to the solenoid coil so that a viscosity of the magnetorheological fluid is varied and so that different resistances are provided.

19. The apparatus of claim 18, wherein the electrical signal is an electrical current having different waveforms.

20. The apparatus of claim 15, wherein the bumps are obliquely mounted in a plurality of mounting areas located on the main body such that they form a gap through which the magnetorheological fluid is able to flow.

* * * * *